O. H. ESCHHOLZ AND H. FAHNOE.
ALTERNATING CURRENT WELDING SYSTEM.
APPLICATION FILED OCT. 6, 1919.
1,343,205. Patented June 15, 1920.
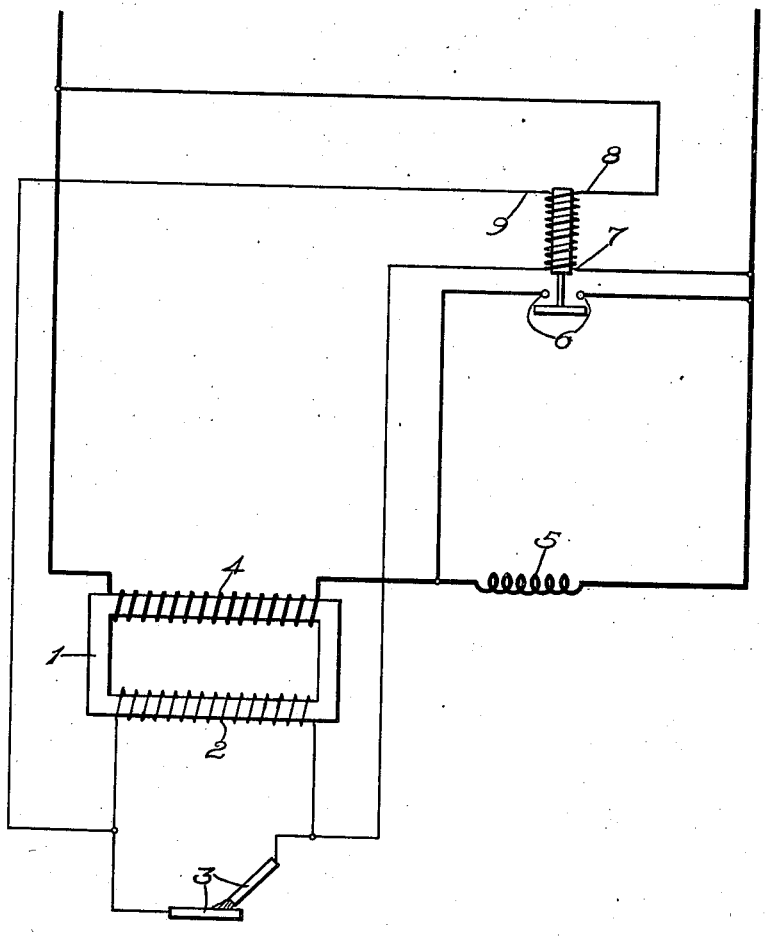
WITNESSES:
J. B. Merrill
O. E. Bee.
INVENTOR
Otto H. Eschholz &
Hans Fahnoe
BY
Wesley G. Carr
ATTORNEY

UNITED STATES PATENT OFFICE.

OTTO H. ESCHHOLZ, OF WILKINSBURG, AND HANS FAHNOE, OF PITTSBURGH, PENNSYLVANIA, ASSIGNORS TO WESTINGHOUSE ELECTRIC AND MANUFACTURING COMPANY, A CORPORATION OF PENNSYLVANIA.

ALTERNATING-CURRENT WELDING SYSTEM.

1,343,205.　　　　　　　Specification of Letters Patent.　　Patented June 15, 1920.

Application filed October 6, 1919. Serial No. 328,798.

*To all whom it may concern:*

Be it known that we, OTTO H. ESCHHOLZ, a citizen of the United States, and a resident of Wilkinsburg, in the county of Allegheny and State of Pennsylvania, and HANS FAHNOE, a citizen of the United States, and a resident of Pittsburgh, in the county of Allegheny and State of Pennsylvania, have invented a new and useful Improvement in Alternating-Current Welding Systems, of which the following is a specification.

Our invention relates to electric arc welding systems and, more particularly, to welding systems employing alternating current, and it has, for its primary object, the provision of welding systems which shall possess good starting characteristics and afford positive protection for the operator against shock hazards.

It has been found feasible to weld by means of alternating current, but difficulty has been experienced in establishing an arc, which difficulty is believed to be occasioned by the reversals of current. We have found that, by employing a relatively high voltage during the period of establishing an arc, and under welding conditions, the welding operation is greatly facilitated. However, the employment of a relatively high voltage introduces a definite shock hazard which is, of course, undesirable.

One object of our invention resides, therefore, in the provision of means for automatically establishing a low open-circuit voltage in alternating-current welding systems.

With these and other objects in view, our invention will be more fully described and illustrated in the drawing which is a diagram of a welding system embodying our invention.

In practising our invention, we may provide a welding system by employing a transformer having primary and secondary windings, the secondary winding of which may be connected to a plurality of electrodes. The primary winding is, of course, connected to a suitable supply circuit and we prefer to employ an impedance, such as a reactance, connected in series with the primary winding. We also employ means for shunting the reactance from the primary circuit under certain conditions, as will be more fully described hereinafter.

In the drawings is shown a transformer 1 having a secondary coil 2 which is directly connected to a plurality of electrodes 3. A primary winding 4 of the transformer 1 is adapted to be connected to an alternating-current supply circuit (not shown), and a reactance 5 is connected in series with the primary winding. A plurality of contact members 6 are connected in parallel relation to the reactance 5 and are adapted to be bridged by a bridging member of a switch 7. The switch 7 is provided with a plurality of switch-actuating coils 8 and 9, the coil 8 being connected in parallel relation to the primary winding 4 and the coil 9 being connected in parallel relation to the secondary winding 2 and the electrodes 3.

In operating the above described welding system, the primary winding 4 is connected to a suitable alternating-current supply circuit having a sufficiently high voltage to facilitate establishing an arc between the electrodes 3. It has been found that a voltage of between 110 and 135 volts gives satisfactory results in facilitating the establishing of an arc by means of alternating current. A voltage of this value, however, introduces a shock hazard when welding is not being performed because the voltage available between the electrodes is sufficiently high if no means is provided to reduce the voltage.

The reactance 5, connected in series with the primary winding 4, effects a reduction of the voltage available between the electrodes 3 when it is in circuit with the primary winding 4. The reactance 5 is, therefore, introduced into the primary circuit at all times when welding is not being performed and it is shunted from the primary circuit, by the switch 7 bridging the contact members 6 under the influence of the coil 8, when an arc is established between the electrodes 3.

The coils 8 and 9 are so wound as to be in opposition to each other at all times and, when welding is not being performed, the full voltage, across the secondary winding 2, is impressed upon the coil 9 which opposes the coil 8 to such an extent that the switch 7 remains in an open position. It will be apparent, therefore, that under open-circuit conditions, the reactance 5 is always in series with the primary winding 4, thereby reducing the voltage available between the electrodes 3, which voltage may be made as low as desired to protect the operator.

When it is desired to start welding, the electrodes 3 are engaged and then slowly separated in the usual manner, the voltage impressed upon the coil 9 being materially reduced while the voltage impressed upon the coil 8 remains substantially the same, and its action, therefore, overcomes the action of the coil 9 and causes the switch 7 to bridge the contact members 6. The reactance is thus shunted from the primary circuit when the electrodes are engaged, thereby making full voltage available between the electrodes and facilitating the establishing of an arc.

It will be appreciated from the foregoing description of the welding system that we have provided simple and inexpensive apparatus which affords positive protection to the operator. Furthermore, since the action of the protective means is entirely automatic, the attention of the operator is not diverted from the work in order to insure that the apparatus shall perform its function.

Furthermore, by employing coils connected in parallel relation to the primary and secondary circuits, they need not be designed to carry a heavy current and, therefore, may be made light in weight and sensitive to changes in circuit conditions.

Although we have shown and specifically described a welding system which embodies our invention, it is obvious that minor changes may be made in the arrangement of the elements embodied in the system, and we desire, therefore, that no limitations shall be imposed except such as are indicated in the appended claims.

We claim as our invention:—

1. An arc welding system comprising a transformer having primary and secondary windings, a plurality of electrodes connected to the secondary winding, an impedance connected to the primary winding and means for shunting the impedance from the primary circuit, said means including a switch and a plurality of switch-actuating coils.

2. An arc welding system comprising a transformer having primary and secondary windings, a plurality of electrodes connected to the secondary winding, an impedance connected to the primary winding and means for shunting the impedance from the primary circuit, said means including a switch and a plurality of opposing switch-actuating coils.

3. An arc welding system comprising a transformer having primary and secondary windings, a plurality of electrodes connected to the secondary winding, an impedance connected to the primary winding and means for shunting the impedance from the primary circuit, said means including a switch and a plurality of switch-actuating coils, one of which is connected in parallel relation to the secondary winding and another of which is connected in parallel relation to the primary winding.

4. An arc welding system comprising a transformer having primary and secondary windings, a plurality of electrodes connected to the secondary winding, an impedance connected to the primary winding and means for shunting the impedance from the primary circuit, said means including a switch and two opposing switch-actuating coils, one of which is connected in parallel relation to the secondary winding and the other of which is connected in parallel relation to the primary winding.

5. An arc welding system comprising a transformer having primary and secondary windings, a plurality of electrodes connected to the secondary winding, an impedance connected in series with the primary winding, a switch adapted to bridge a plurality of contact members connected in parallel relation to the impedance, and a plurality of opposing switch-actuating coils adapted to actuate the switch to bridge the contact members when an arc is drawn between the electrodes.

6. An arc welding system comprising a transformer having primary and secondary windings, a plurality of electrodes connected to the secondary winding, an impedance connected in series with the primary winding, a switch adapted to bridge a plurality of contact members connected in parallel relation to the impedance, and two opposing switch-actuating coils, one of which is connected in parallel relation to the secondary winding and the other of which is connected in parallel relation to the primary winding.

In testimony whereof, we have hereunto subscribed our names this 30th day of Sept., 1919.

OTTO H. ESCHHOLZ.
HANS FAHNOE.